US007216123B2

(12) United States Patent
Kamvar et al.

(10) Patent No.: US 7,216,123 B2
(45) Date of Patent: May 8, 2007

(54) METHODS FOR RANKING NODES IN LARGE DIRECTED GRAPHS

(75) Inventors: Sepandar D. Kamvar, Palo Alto, CA (US); Taher H. Haveliwala, Mountain View, CA (US); Glen Jeh, San Francisco, CA (US); Gene Golub, Stanford, CA (US)

(73) Assignee: Board of Trustees of the LeLand Stanford Junior University, Palo Alto, CA (US)

( * ) Notice: Subject to any disclaimer, the term of this patent is extended or adjusted under 35 U.S.C. 154(b) by 0 days.

(21) Appl. No.: 10/646,331

(22) Filed: Aug. 22, 2003

(65) Prior Publication Data

US 2005/0033742 A1 Feb. 10, 2005

Related U.S. Application Data

(60) Provisional application No. 60/458,921, filed on Mar. 28, 2003.

(51) Int. Cl.
*G06F 17/30* (2006.01)

(52) U.S. Cl. .............. 707/5; 707/7; 707/10; 715/501.1; 715/513

(58) Field of Classification Search .............. 707/5, 707/7, 3, 10
See application file for complete search history.

(56) References Cited

U.S. PATENT DOCUMENTS 6,112,202 A    8/2000  Kleinberg
6,138,113 A *  10/2000 Dean et al. ............. 707/2
6,285,999 B1 * 9/2001  Page ...................... 707/5
6,560,600 B1 * 5/2003  Broder .................... 707/7
6,584,468 B1 * 6/2003  Gabriel et al. .......... 707/10
6,665,837 B1 * 12/2003 Dean et al. ........... 715/501.1
6,799,176 B1 * 9/2004  Page ...................... 707/5
6,871,202 B2 * 3/2005  Broder .................... 707/7
6,922,685 B2 * 7/2005  Greene et al. .......... 707/1
2003/0204502 A1 * 10/2003 Tomlin et al. ......... 707/5
2003/0208478 A1 * 11/2003 Harvey .................... 707/3
2003/0208482 A1 * 11/2003 Kim et al. ................ 707/3
2004/0024752 A1 * 2/2004  Manber et al. .......... 707/3
2004/0111412 A1 * 6/2004  Broder .................... 707/7

* cited by examiner

*Primary Examiner*—Jean M. Corrielus
(74) *Attorney, Agent, or Firm*—DeMont & Breyer, LLC

(57) ABSTRACT

Techniques for assigning ranks to nodes in a large linked database, such as world wide web or any other hypermedia database, partition the nodes so that the link matrix has a predominantly block-diagonal form. Within each block, a local rank is computed for nodes in the block, possibly by different computer in a distributed computing environment. A block rank is then estimated for each block as a whole, and may optionally include block-level weights to implement customized ranking. The local ranks and block ranks are then combined to form a global rank, which may be used to rank the nodes. Alternatively, a global rank vector for the database may be used as an initial vector in an iterative link-based ranking scheme to obtain more accurate global ranks for the nodes. The global rank vector may be divided to provide local rank vectors for use in subsequent applications of the method.

30 Claims, 3 Drawing Sheets

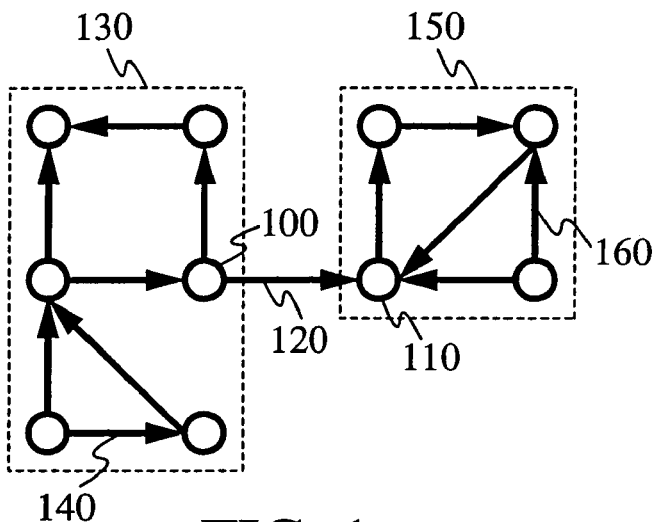

FIG. 1

Child Nodes

|   | 0 | 1 | 2 | 3 | 4 | 5 | 6 | 7 | 8 | 9 |
|---|---|---|---|---|---|---|---|---|---|---|
| 0 | $a_{00}$ | $a_{01}$ | $a_{02}$ | $a_{03}$ | $a_{04}$ | $a_{05}$ | $a_{06}$ | $a_{07}$ | $a_{08}$ | $a_{09}$ |
| 1 | $a_{10}$ | $a_{11}$ | $a_{12}$ | $a_{13}$ | $a_{14}$ | $a_{15}$ | $a_{16}$ | $a_{17}$ | $a_{18}$ | $a_{19}$ |
| 2 | $a_{20}$ | $a_{21}$ | $a_{22}$ | $a_{23}$ | $a_{24}$ | $a_{25}$ | $a_{26}$ | $a_{27}$ | $a_{28}$ | $a_{29}$ |
| 3 | $a_{30}$ | $a_{31}$ | $a_{32}$ | $a_{33}$ | $a_{34}$ | $a_{35}$ | $a_{36}$ | $a_{37}$ | $a_{38}$ | $a_{39}$ |
| 4 | $a_{40}$ | $a_{41}$ | $a_{42}$ | $a_{43}$ | $a_{44}$ | $a_{45}$ | $a_{46}$ | $a_{47}$ | $a_{48}$ | $a_{49}$ |
| 5 | $a_{50}$ | $a_{51}$ | $a_{52}$ | $a_{53}$ | $a_{54}$ | $a_{55}$ | $a_{56}$ | $a_{57}$ | $a_{58}$ | $a_{59}$ |
| 6 | $a_{60}$ | $a_{61}$ | $a_{62}$ | $a_{63}$ | $a_{64}$ | $a_{65}$ | $a_{66}$ | $a_{67}$ | $a_{68}$ | $a_{69}$ |
| 7 | $a_{70}$ | $a_{71}$ | $a_{72}$ | $a_{73}$ | $a_{74}$ | $a_{75}$ | $a_{76}$ | $a_{77}$ | $a_{78}$ | $a_{79}$ |
| 8 | $a_{80}$ | $a_{81}$ | $a_{82}$ | $a_{83}$ | $a_{84}$ | $a_{85}$ | $a_{86}$ | $a_{87}$ | $a_{88}$ | $a_{89}$ |
| 9 | $a_{90}$ | $a_{91}$ | $a_{92}$ | $a_{93}$ | $a_{94}$ | $a_{95}$ | $a_{96}$ | $a_{97}$ | $a_{98}$ | $a_{99}$ |

Parent Nodes

FIG. 2

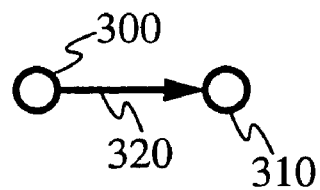
FIG. 3
|   | 0 | 1 |
|---|---|---|
| 0 | $B_{00}$ | $B_{01}$ |
| 1 | $B_{10}$ | $B_{11}$ |
FIG. 4
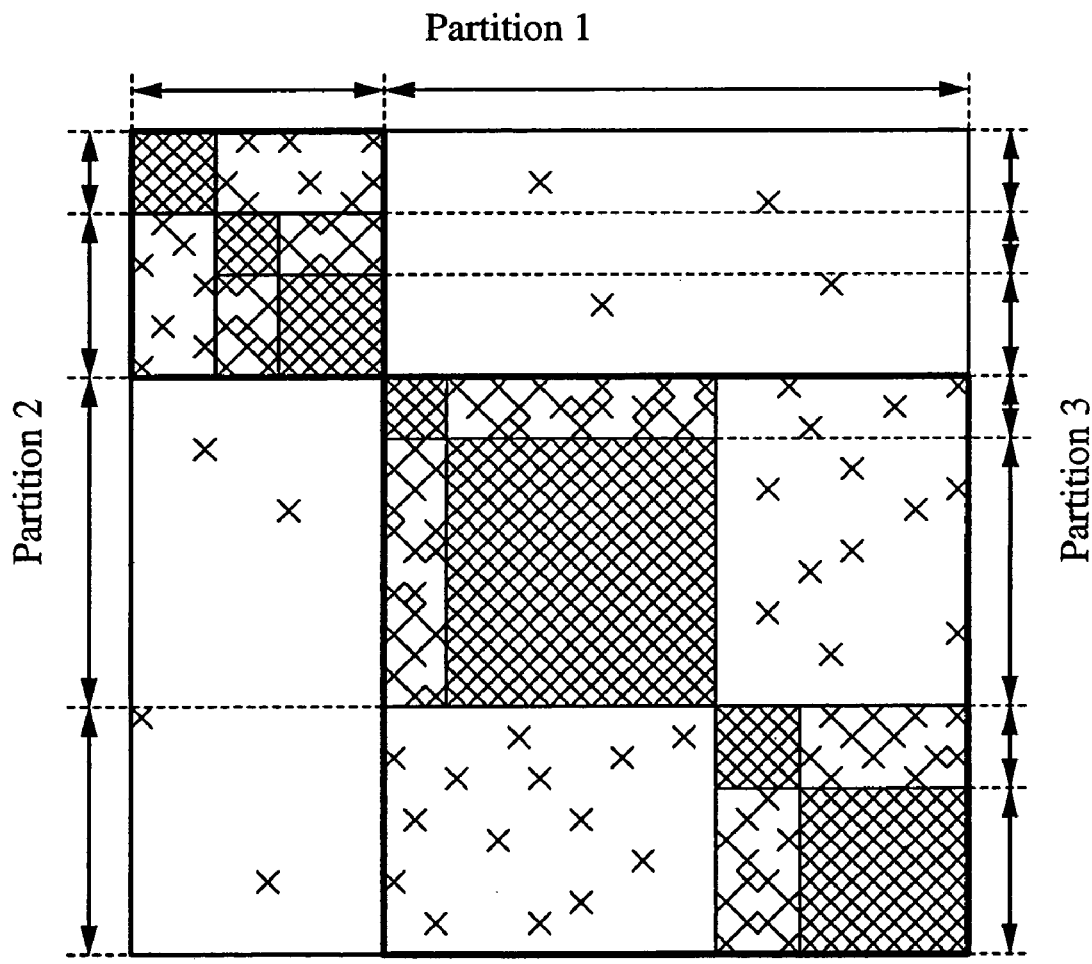
FIG. 5

METHODS FOR RANKING NODES IN LARGE DIRECTED GRAPHS

CROSS-REFERENCE TO RELATED APPLICATIONS

This application claims priority from U.S. provisional patent application No. 60/458,921 filed Mar. 28, 2003, which is incorporated herein by reference.

STATEMENT OF GOVERNMENT SPONSORED SUPPORT

This invention was supported in part by the National Science Foundation under Grant No. IIS-0085896 and Grant No. CCR-9971010. The US Government has certain rights in the invention.

FIELD OF THE INVENTION

This invention relates generally to improved techniques for analyzing large directed graphs. More particularly, it relates to methods for reducing the computational complexity of assigning ranks to nodes in a large linked database, such as world wide web or any other hypermedia database.

BACKGROUND OF THE INVENTION

A linked database (i.e., any database of documents containing mutual citations, such as the world wide web or other hypermedia archive) can be represented as a directed graph of N nodes, where each node corresponds to a document and where the directed connections between nodes correspond to directed links from one document to another. A given node has a set of forward links that connect it to children nodes, and a set of backward links that connect it to parent nodes.

Often it is useful to rank or assign importance values to the nodes. For example, the relevance of database search results can be improved by sorting the retrieved documents according to their ranks, and presenting the most important documents first. One approach to ranking is to determine the rank from the intrinsic content of a document, or from the anchor text of its parent documents. When the database has millions or billions of nodes, however, this approach becomes computationally prohibitive. Another more efficient approach is to determine the ranks from the extrinsic relationships between nodes, i.e., from the link structure of the directed graph. This type of approach is called link-based ranking. For example, U.S. Pat. No. 6,285,999 to Page discloses a link-based ranking technique used by the Google search engine for assigning ranks to web pages. The page rank is a measure of the importance of a page, recursively defined as a function of the ranks of its parent documents. Looked at another way, the rank of a web page is the steady-state probability that a web surfer ends up at the page after randomly following a large number of links. Thus, a page will tend to have a higher rank if it has many parent links, or if its parents themselves have high rank. The page ranks for the database are calculated by finding the principal eigenvector of an N×N link matrix A where each element $a_{ij}$ of A represents a probability of moving from node i to node j of a directed graph of N nodes. The principal eigenvector may be computed using the power method, an iterative procedure that calculates the steady-state probability vector x defined as the vector to which $x_n = A^n x_0$ converges as n grows very large, where $x_0$ is an initial N-dimensional vector, e.g., a uniform distribution. The rank $x_k$ for a node k is simply the $k^{th}$ component of the vector x. A similar link-based ranking technique disclosed in U.S. Pat. No. 6,112,202 calculates the singular value decomposition of A and defines the rank of a node as the corresponding component of the singular vector. A simple but not very subtle technique ranks a node by simply counting the number of parent nodes it has.

Although these link-based ranking techniques are improvements over prior techniques, in the case of an extremely large database, such as the world wide web which contains billions of pages, the computation of the ranks for all the pages can take considerable time. Accordingly, it would be valuable to provide techniques for calculating page ranks with greater computational efficiency.

SUMMARY OF THE INVENTION

The inventors have discovered that it is possible to speed up the computation of ranks in an extremely large linked database by exploiting structural properties of the directed graph for the database. More specifically, the inventors have recognized that most links in linked databases are between nodes sharing a common natural classification or type. For example, in the case of a web database, pages can be classified by domain name, and most links in the web are between pages in the same domain. This classification of nodes in a linked database can be used to partition the nodes so that the link matrix for the database has a predominantly block-diagonal form, where the blocks correspond to the classes used to form the partition. Moreover, within each class there may be sub-classes, resulting in corresponding sub-blocks of the link matrix.

The inventors have discovered that this nested block structure of the link matrix can be used to decompose and simplify the computation of ranks into separable steps, significantly increasing the speed of link-based ranking. In effect, the block-diagonal structure of the link matrix means that, to a good approximation, the blocks may be decoupled from each other and can be treated independently as localized link matrices. This allows the computation of the ranks to be decomposed into separate parallel computations, one for each block. The results of these separate computations for the various localized blocks can then be combined with a block-level ranking to produce an approximate global ranking value for each node. Specifically, within each block, a local rank may be computed for each node in the block. In addition, a block-level rank is computed for each block. A global rank may be calculated for a node by combining its local rank with the block rank of the block containing it. These global ranks are good approximations to the actual ranks. Thus, they can be used as approximate ranks, or used as estimated global ranks to form an initial vector to begin an iterative calculation of actual global ranks. The iterative calculation will converge much more quickly to the actual rank because the initial vector starts much closer to the limiting value of the iterative computation than a uniform distribution.

In addition to speeding up the ranking computations, this approach also has the advantage that the computation of local ranks within each block is independent of other blocks. Thus, local ranks can be calculated using different computers, at different times, using different ranking schemes. Once the partition of the database is determined, the computations associated with analyzing the link structure of each block of nodes can begin. In addition, the blocks can be analyzed in parallel on separate processors, e.g., local rank vectors may be computed at different computers which then send the vectors to a central computer that combines them with a block rank vector to calculate the global rank vector. Thus, the technique could be implemented in a highly distributed fashion, providing great speed. The technique also allows ranks to be efficiently updated after selected blocks of the database are updated or altered. Another advantage is that blocks or sub-blocks are much smaller than the entire web matrix and can be individually analyzed much more efficiently, e.g., by storing the current block or sub-block data completely in main memory. The block-structure also provides a practical way to implement customized rank values. Specifically, customized block ranks can be computed using a set of block weights corresponding to the subsets of the partition of nodes. A customized global rank vector can then be computed using the generic local page ranks and these customized block ranks.

BRIEF DESCRIPTION OF THE DRAWINGS

FIG. 1 is an illustration of a directed graph representing a simple linked database wherein the nodes of the database are partitioned into two classes in accordance with the teachings of the present invention.

FIG. 2 is a table representing a link matrix A corresponding to the directed graph of FIG. 1 wherein the two classes of nodes result in two corresponding blocks in accordance with the teachings of the present invention.

FIG. 3 is an illustration of a directed graph wherein each node represents a subset of nodes from the graph of FIG. 1 and each link represents a collection of links between two subsets in accordance with the teachings of the present invention.

FIG. 4 is a table representing a link matrix corresponding to the directed graph of FIG. 3 wherein the elements correspond to the links between the nodes in FIG. 3 in accordance with the teachings of the present invention.

FIG. 5 is a schematic representation of a link matrix for a large linked database wherein the nodes are partitioned into classes and sub-classes resulting in a link matrix With blocks and sub-blocks along the diagonal in accordance with the teachings of the present invention.

DETAILED DESCRIPTION

Figure 6:
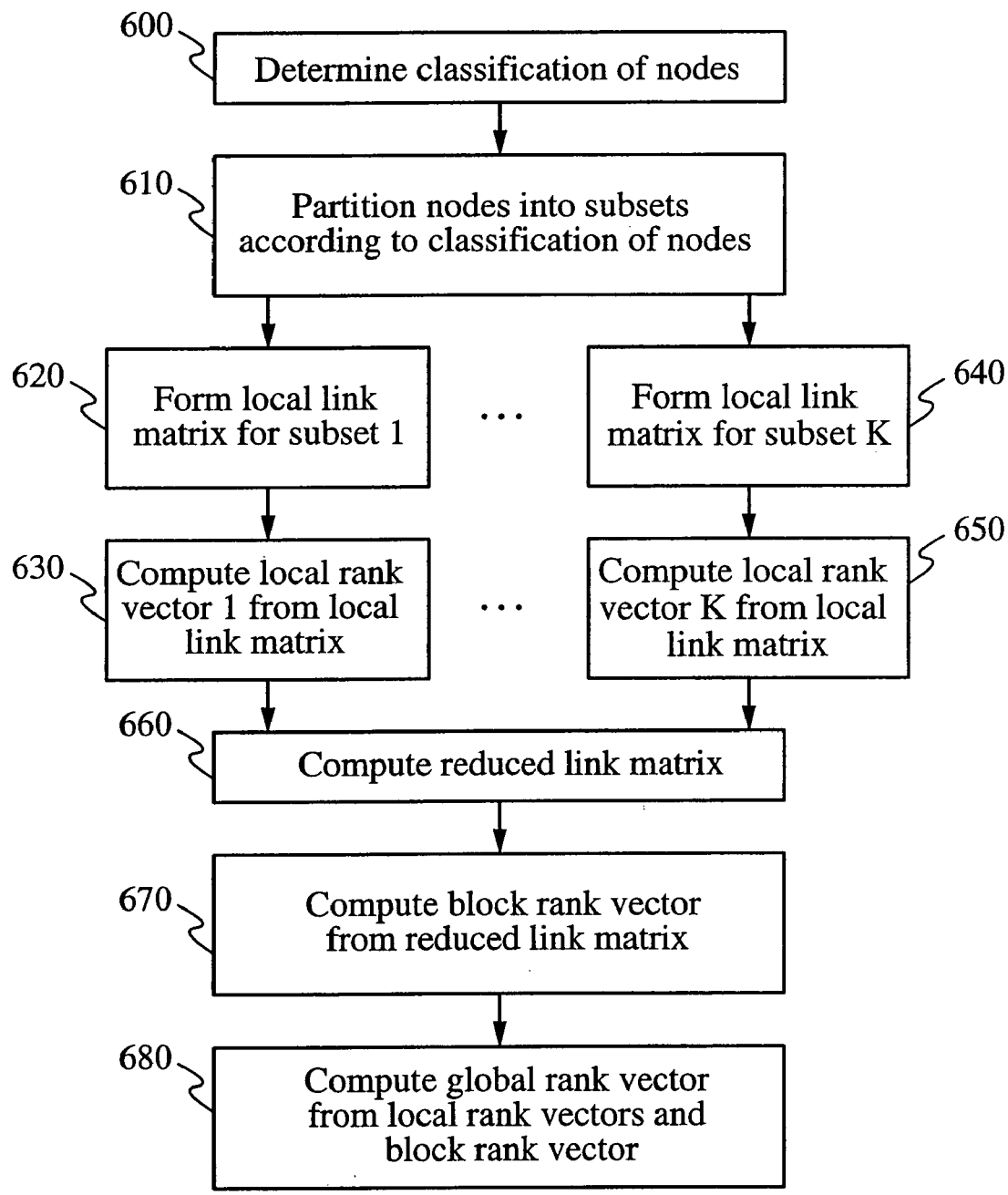
FIG. 6 is a flow chart illustrating a technique for computing ranks of nodes in a linked database in accordance with the teachings of the present invention.

Specific embodiments of the present invention are described in detail below with reference to the drawing figures. Although these detailed descriptions contain many specifics for the purposes of illustration, anyone of ordinary skill in the art will appreciate that many variations and alterations to the those details are within the scope of the invention. Accordingly, these embodiments of the invention are set forth without any loss of generality to, and without imposing limitations upon, the invention.

According to an embodiment of the invention, a method is provided for efficiently ranking nodes in a linked database. In general, a linked database has the structure of a directed graph of N linked nodes, where the nodes represent documents, records, or other data elements and the links between nodes represent citations, references, or other links between the nodes. Examples of linked databases include linked electronic hypertext documents, journal articles citing each other, patents citing other patents, newsgroup postings or email messages referencing each other, and networks of individuals or organizations linked to each other by some type of association or evaluation. FIG. 1 shows a directed graph representing a linked database. For simplicity of illustration only, the graph of FIG. 1 represents a small database with only ten nodes. The principles of the present invention, however, apply to any size database. Databases used with embodiments of the present invention may have thousands, millions, or even billions of nodes, each of which may be connected to other nodes by links. For example, node 100 and node 110 are connected by link 120. The link is directed from node 100 to node 110, so node 100 is called a parent of node 110, and node 110 is called a child of node 100. Link 120 is called a forward link or out link of node 100, and is called a back link or in link of node 110.

In order to facilitate the calculation of ranks for the nodes, the nodes of the database are partitioned into classes or subsets. For example, the nodes of FIG. 1 are partitioned into two subsets, a first subset of nodes 130 and a second subset of nodes 150. Generally, the partition may result in any number of subsets. There are various possible ways to partition the nodes. The partition may be predetermined a priori by a preexisting classification, and/or calculated by computational analysis of the database. For example, in the case of an internet hypertext database such as the web, the nodes may be classified by preexisting information contained in the uniform resource locator (URL) associated with the node, e.g., the domain name, host name, and/or directory path name of the hypertext document. In the case of a database of academic articles, the nodes may be partitioned by field of study, and/or by journal. For a patent database, the nodes may be partitioned by class and/or subclass. If there is no suitable predetermined classification information available that provides a basis for naturally partitioning the nodes, various methods may be used to create the partition, including but not limited to hierarchical agglomerative clustering methods, divisive clustering methods, and k-means or other iterative clustering methods.

Preferably, the nodes are partitioned so that within each subset the nodes are linked predominantly with each other, i.e., there are many couplings or links between nodes within the same subset and relatively few couplings or links between nodes of distinct subsets. Thus, each subset represents a coherent group of nodes strongly coupled to each other but only weakly coupled to nodes in other subsets. For example, it is evident from FIG. 1 that the nodes in subset 130 are predominantly linked with each other by links such as link 140, and that the nodes in subset 150 are predominantly linked with each other by links such as link 160, but that nodes in subset 130 and nodes in subset 150 are connected by relatively few links: just the single link 120. In linked databases where the nodes are associated with documents pertaining to a specific subject, this partitioning will divide the nodes by subject classification since documents tend to cite other documents that pertain to a closely related subject matter, and tend not to cite other documents that pertain to unrelated subject matter.

The directed graph for a linked database of N nodes has an associated N×N link matrix A representing the link structure of the directed graph. The value of an element $a_{ij}$ of A represents a weight for the link from node i to node j. FIG. 2 is a table representing a link matrix A corresponding to the directed graph of FIG. 1. Each cell of the table represents a weight $a_{ij}$ of a link from a parent node i to a child node j.

There are many ways to determine these weights. For example, $a_{ij}$ can be 1 if node i links to node j and 0 otherwise.

In another example, $a_{ij}$ can be set equal to the fraction of forward links from node i that connect to node j. Alternatively, if F is this fraction, then $a_{ij}$ can be set equal to $cF+(1-c)/N$, where c represents a link coupling coefficient. The value of $a_{ij}$ may involve other terms to account for other link effects as well. Generally, if there is no link from a node i to a node j, then the corresponding weight $a_{ij}$ is normally zero or at least minimal in comparison with other weights. The larger, non-zero weights correspond to pairs of nodes with links between them.

Because the partitioning of the nodes divides them into predominantly decoupled subsets of nodes, the columns and rows of link matrix A may be organized in accordance with the partition of nodes to put the matrix A into a predominantly block-diagonal form. In other words, the larger, non-zero weights will be mostly present within square blocks along the diagonal, while most of the weights outside of these blocks will be minimal or zero. For example, FIG. 2 shows two blocks along the diagonal (corresponding to the two groups 130 and 150 shown in FIG. 1). The first block contains links between nodes 0 to 5 and the second block contains links between nodes 6 to 9. Thus, the matrix A for the linked database may be decomposed into a predominantly block-diagonal form in accordance with the partition of the nodes. Alternatively, the partition of the nodes into subsets can be used to directly form a localized link matrix for each subset, rather than first creating the entire matrix A and decomposing it into blocks to obtain the localized link matrices.

Depending on the nature of the database and the particulars of the implementation, each block of a link matrix may be further decomposed into sub-blocks in accordance with a sub-partition of the nodes belonging to the block. As with the original partition, the sub-partition may be predetermined by preexisting classification information or determined by calculation from the linked database. The sub-blocks may in turn be further decomposed similarly, resulting in a nested block-diagonal structure for the link matrix., as shown in FIG. 5. Depending on their structure, some blocks may be iteratively decomposed further than others. For example, some domains on the web have many links to themselves, while others do not exhibit decoupling until the host level or director level. More generally, a block may be further decomposed into sub-blocks as long as the number of non-zero off-diagonal elements produced by such a decomposition is below a predetermined threshold. In other words, if the sub-blocks are sufficiently decoupled by the decomposition, then the block may be further decomposed. To give a specific illustration of this technique, if a block-decomposition results in over 90% of the links being contained within the sub-blocks (after dangling nodes are removed), then the block is decomposed into the sub-blocks. In the case of a distributed hypertext database such as the web, the smallest blocks are usually very small in comparison with the entire web. Once the decomposition process is complete, a final partition of the nodes is determined.

Because the localized link matrix blocks in the block-diagonal decomposition of A are predominantly decoupled, they may be analyzed and processed independently to provide various advantages in computational efficiency. In particular, any ranking method may be used to compute the ranks of the nodes in each block with complete independence from the other blocks and the ranking of their nodes. For example, a link-based ranking technique can calculate the local link vector from the local link matrix of one block considered in isolation from the other blocks. Each block of nodes can use a different ranking scheme, and can be executed at different times. The result of this localized ranking of nodes in a subset of nodes is a local rank vector whose components are local rank values (or scores) for the nodes in the subset. When performed for all K blocks in the database, the result is a set of K local rank vectors $x_1, \ldots, x_K$ corresponding to the K blocks. The localized ranking may be any technique for ranking nodes of a linked database, including link-based methods such as finding the principal eigenvector of the link matrix, performing a singular value decomposition of the link matrix, or simply counting back links. The localized ranking may also be calculated using other ranking techniques as well. For example, local ranks for nodes in a subset of nodes may be calculated based on node access statistics, or assigned based on a set of criteria or standards. Various combinations of these ranking techniques may be used as well.

The partition of the nodes in the directed graph for a linked database may be used to form a K×K reduced link matrix B, where K is the number of subsets in the partition. The reduced link matrix is a link matrix for a reduced directed graph induced by the partition. Specifically, the subsets of nodes created by the partition correspond to nodes of the reduced directed graph. For example, FIG. 3 is an illustration of a reduced directed graph where nodes 300 and 310 represent subsets of nodes 130 and 150 from the directed graph of FIG. 1. The link 320 in FIG. 3 represents the link 120 between subsets 130 and 150 of FIG. 1. If more links were present between nodes of subsets 130 and 150, these links would be combined into single link 320. The block link matrix B represents the link structure of the reduced graph. For example, FIG. 4 is a table representing a link matrix corresponding to the directed graph of FIG. 3. The diagonal elements of matrix B correspond to the blocks along the diagonal of matrix A. The off-diagonal elements of B represent the links between the subsets of nodes.

The matrix B can be calculated in various alternative ways. For example, the weight $B_{IJ}$ of the link between subsets I and J may be calculated to be the sum of weights $a_{ij}$ of links from nodes in block I to nodes in block J, where each is weighted by a local rank of the node i in block I. That is, $B_{IJ}=\Sigma_{ij}a_{ij}(x_I)_i$, where $(x_I)_i$ is the i-th component of the local rank vector $x_I$ (i.e., the rank of node i in block I), and where the sum is over all nodes j in block J and all nodes i in block I. Alternatively, each block link matrix component may be calculated to be the ratio of the number of links from subset I to subset J to the number of out links from subset I. The link matrix weights may also depend on personalization weights, resulting in block ranks that are customized to an individual. For example, K personalization weights $v_1, \ldots, v_K$ may be used to derive a customized link matrix B' from the generic link matrix B by defining its elements as follows: $B'_{IJ}=cB_{IJ}+(1-c)v_J$. The effect of this is to alter the coupling strength of links to subset J from any other subset I. In the case of a web surfer, this can be interpreted as a weighted change in the probability that the surfer will randomly decide to jump to block J. So, by selecting the K weights to reflect levels of personal interest in subjects associated with the K blocks, the resulting block link matrix will be altered so that the transitions more accurately reflect personal preferences.

Using a link-based ranking technique, a block rank vector $b=(b_1, \ldots, b_K)$ may be calculated from the reduced link matrix B, where each component $b_k$ of the vector b is a block-level rank for the k-th subset of nodes. Examples of link-based ranking techniques include finding the principal eigenvector of the link matrix, performing a singular value decomposition of the link matrix, or simply counting back links. The link-based ranking technique used in this step is not necessarily the same as any of the one or more link-based ranking techniques used in calculating the local ranks. If the block link matrix has been customized, the block rank vector calculated from this customized link matrix will also reflect the personal preferences. In particular, preferred blocks will be ranked higher than they would have been ranked otherwise.

Once the local rank vectors $x_1, \ldots, x_K$ for the subsets are obtained, and the block rank vector b for the reduced graph is obtained, a global rank vector g may be computed. For example, one may define the global rank $g_i$ for a node i in block I to be the local rank of the node scaled by the block rank of the block to which the node belongs. That is, $g_i = (x_I)_i b_I$. Clearly, the local and block ranks may be combined in other ways as well. One may perform this for all nodes to obtain a global rank vector whose elements are the ranks of nodes for the entire linked database. To obtain the global rank for just one node, however, it is not necessary to calculate the entire global rank vector. It is sufficient to combine the local rank for the node with the block rank for the node. In any case, once it has been calculated, the global rank can be used as the rank of the node, or as an advanced starting point in a more refined calculation of the rank. In the latter case, one typically computes the entire global rank vector, then uses an iterative link-based ranking technique to refine it. A particular global rank for a selected node can then be found by simply selecting the appropriate component of the global rank vector corresponding to the selected node.

The approach of computing the rank by a two-stage process of computing local ranks and block ranks, then combining them to produce global ranks has several important advantages. Because the local ranks can be computed independently, they may be computed in parallel by separate processors. Even if the computation is not distributed, there are computational gains inherent in the decoupling of the link matrix into separate blocks. In addition, because the local link matrices are smaller than the link matrix for the entire database, they can be computed more efficiently in cases where the local link matrix can be contained entirely in memory. Another advantage is that when a portion of the database is updated or modified, only the associated local ranks need to be recomputed, and that re-computation can make use of a prior local rank vector. The approach also simplifies the computation of personalized or customized ranks. For example, a personalized weight vector (one weight for each subset) can be used when computing the block ranks. A customized global rank can be easily computed from a customized block rank and the local ranks, providing a simple way to customize global ranks with minimal additional computational overhead. Moreover, the local ranks need not be re-computed each time a new customized rank is calculated. The local ranks can be stored and re-used to calculate various different customized ranks based on various personalization weight vectors.

FIG. 6 is a flow chart that provides an overview of a technique for computing ranks of nodes in a linked database according to one embodiment of the invention. In step 600 a classification of the nodes in the linked database is determined. If the classification is based on a preexisting classification of the nodes in the database, step 600 may be omitted. Otherwise, the linked database is analyzed to classify the nodes such that the resulting classes are substantially decoupled from each other. In step 610 the classification is used to partition the nodes into K subsets. This step may be omitted in the case where the nodes are already divided into subsets according to the partition (e.g., as in the case of a distributed database where the subsets correspond to various computer systems storing distinct parts of the database). Otherwise, the nodes are organized or sorted in accordance with the partition to create the K subsets. In step 620 a first local link matrix is formed for a first node subset, and in step 630 a first local rank vector $x_I$ is calculated from the first local link matrix. Analogous steps are performed for the other subsets, up to and including step 640 where a $K^{th}$ local link matrix is formed for the $K^{th}$ subset, and step 650 where a $K^{th}$ local rank vector $x_K$ is calculated. These steps may be performed independently on separate processors (e.g., on the various computer systems of a distributed database). In step 660 a reduced link matrix B is formed, and in step 670 a block rank vector b is computed from the link matrix B. A global rank vector is computed in step 680 by combining the local rank vectors with the block rank vector.

The global rank vector may be used to rank search results, or may be used as an initial vector in a link-based ranking technique for the database link matrix A that computes a final global rank vector. The global rank vector may also be used in subsequent applications of the method to provide local rank vectors without the need to compute each one again from the local link matrix. The local rank vectors may be obtained by dividing the global rank vector into K parts corresponding to the K subsets of the partition. One or more of these local rank vectors can be used in subsequent re-calculations of the global rank vector. Thus, in general, the local rank vectors need not be computed from the local link matrix, but may be computed by dividing a preexisting global rank vector, or by using any node ranking technique for the subset of nodes.

The above techniques can be advantageously combined, together or separately, with other techniques for speeding up page rank computations, e.g., quadratic extrapolation and the algorithm of Gauss-Seidel.

The invention claimed is:

1. A computer implemented method for computing ranks in a linked database, the method comprising:
obtaining a local rank vector associated with a selected subset of nodes in the linked database, wherein each component of the local rank vector represents a local rank of a node in the selected subset of nodes;
obtaining a block rank vector associated with the linked database, wherein each component of the block rank vector represents a block rank of a subset of nodes in the linked database, wherein the subset is one of a plurality of subsets of nodes defined by a partition of the nodes in the linked database;
selecting a component of the block rank vector corresponding to the selected subset of nodes;
selecting a component of the local rank vector corresponding to a selected node in the selected subset of nodes;
combining the selected component of the block rank vector and the selected component of the local rank vector to obtain a global rank for the selected node; and
storing the global rank of the selected node on a computer readable medium.

2. The method of claim 1 wherein obtaining the local rank vector comprises receiving the local rank vector from a computer that calculated the local rank vector.

3. The method of claim 1 wherein obtaining the local rank vector comprises selecting components of a preexisting global rank vector.

4. The method of claim 1 wherein obtaining the local rank vector comprises forming a local link matrix comprising link weights between nodes of the selected subset and computing the local rank vector from the local link matrix.

5. The method of claim 1 further comprising classifying the nodes of the linked database into subject classes and creating the partition of the nodes into the plurality of subsets in accordance with the subject classes.

6. The method of claim 1 further comprising obtaining a plurality of local rank vectors associated with the plurality of subsets.

7. The method of claim 1 wherein obtaining the block rank vector comprises forming a reduced link matrix for the linked database and computing the block rank vector from the reduced link matrix.

8. The method of claim 7 wherein forming the reduced link matrix comprises using a set of preference weights associated with the subsets to alter elements of the reduced link matrix so that the block rank vector is customized in accordance with the preference weights.

9. The method of claim 1 further comprising calculating a final rank from the global rank using an iterative link-based ranking technique.

10. The method of claim 1 further comprising using the global rank to determine an order of presentation of the selected node among other nodes.

11. A computer implemented method for computing a rank value for a node in a linked database, the method comprising:
partitioning nodes of the linked database into K subsets according to a classification of the nodes, wherein K comprises the number of subsets produced by the partitioning;
computing K local rank vectors for the K subsets of the nodes;
computing a block rank vector from a K×K reduced link matrix;
computing a global rank vector from the local rank vectors and the block rank vector;
selecting a component of the global rank vector corresponding to the node to obtain the rank value for the node; and
storing the rank value of the selected node on a computer readable medium.

12. The method of claim 11 wherein computing the K local rank vectors comprises arranging a link matrix for the linked database into a block-diagonal form corresponding to the partition of the nodes into subsets; forming K local link matrices from blocks of the link matrix, and computing the K local rank vectors from the K local link matrices.

13. The method of claim 11 wherein computing the K local rank vectors comprises executing a link-based ranking algorithm on a local link matrix.

14. The method of claim 13 wherein the link-based ranking algorithm comprises calculating a principal eigenvector of the local link matrix.

15. The method of claim 13 wherein the link-based ranking algorithm comprises performing a singular value decomposition of the local link matrix.

16. The method of claim 13 wherein the link-based ranking algorithm comprises forming a vector representing the row sums or column sums of the matrix.

17. The method of claim 11 wherein computing the K local rank vectors comprises dividing a preexisting global rank vector into K parts.

18. The method of claim 11 wherein computing the block rank vector comprises forming a reduced link matrix whose elements represent links between the subsets of the partition, and calculating the block rank vector from the reduced link matrix.

19. The method of claim 18 wherein forming the reduced link matrix comprises computing a block link weight between a first block and a second block by adding together weights of links from nodes in the first block to nodes in the second block.

20. The method of claim 18 further comprising customizing the reduced link matrix using a set of preference weights associated with the subsets.

21. The method of claim 11 wherein computing the global rank vector from the local rank vector and a block rank vector comprises:
computing an estimated global rank vector from the local rank vector and a block rank vector;
computing the global rank vector from the estimated global rank vector using an iterative link-based ranking technique.

22. The method of claim 11 wherein computing the K local rank vectors is performed at K distributed computers, and wherein computing the global rank vector is performed at a central computer.

23. The method of claim 11 wherein the linked database is a distributed collection of hypertext documents and the classification of the nodes is based on URL addresses of the nodes.

24. The method of claim 11 wherein the classification of the nodes is a predetermined subject classification of documents in the linked database.

25. The method of claim 11 wherein the classification of the nodes is computationally determined from a link structure of the linked database.

26. The method of claim 11 wherein the classification of the nodes is computationally determined from a similarity of content associated with nodes.

27. A computer implemented method for computing a rank value for a block of nodes in a linked database, the method comprising:
partitioning nodes of the linked database into subsets according to a classification of the nodes;
forming a reduced link matrix whose elements represent links between the subsets of the partition;
calculating a block rank vector from the reduced link matrix;
selecting a component of the block rank vector corresponding to the block of nodes to obtain the rank value for the block of nodes; and
storing the rank value for the block of nodes on a computer readable medium.

28. The method of claim 27 wherein forming the reduced link matrix comprises computing a block link weight between a first block and a second block by adding together weights of links from nodes in the first block to nodes in the second block.

29. The method of claim 27 wherein the classification of the nodes is a predetermined subject classification of documents in the linked database.

30. The method of claim 27 wherein the classification of the nodes is computationally determined from a link structure of the linked database.

* * * * *